June 7, 1927.
A. G. BELDEN
1,631,458
MACHINE TOOL WORK SUPPORTING AND DRIVING MECHANISM
Filed Feb. 19, 1924    2 Sheets-Sheet 1
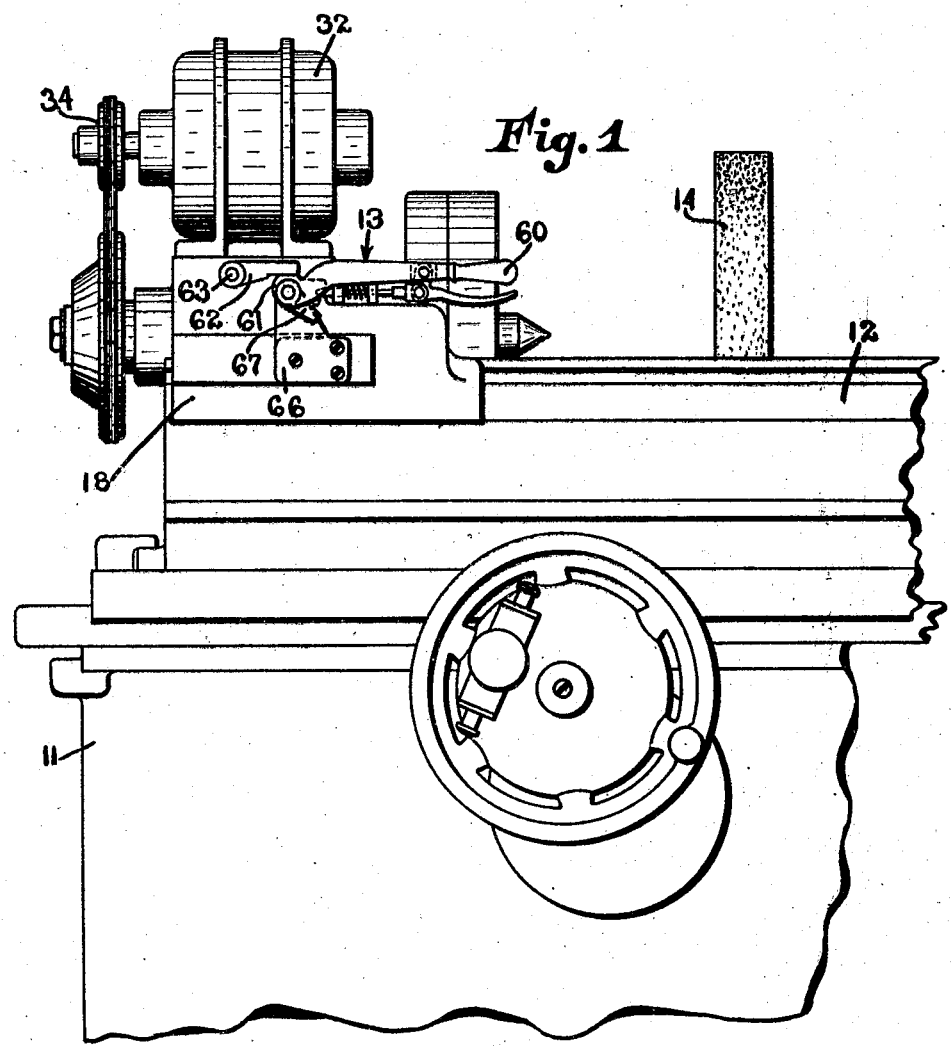
Witnesses
Harold W. Eaton
Leah A. Sessions
Inventor
Albert G. Belden
By
Clayton L. Jenks
Attorney

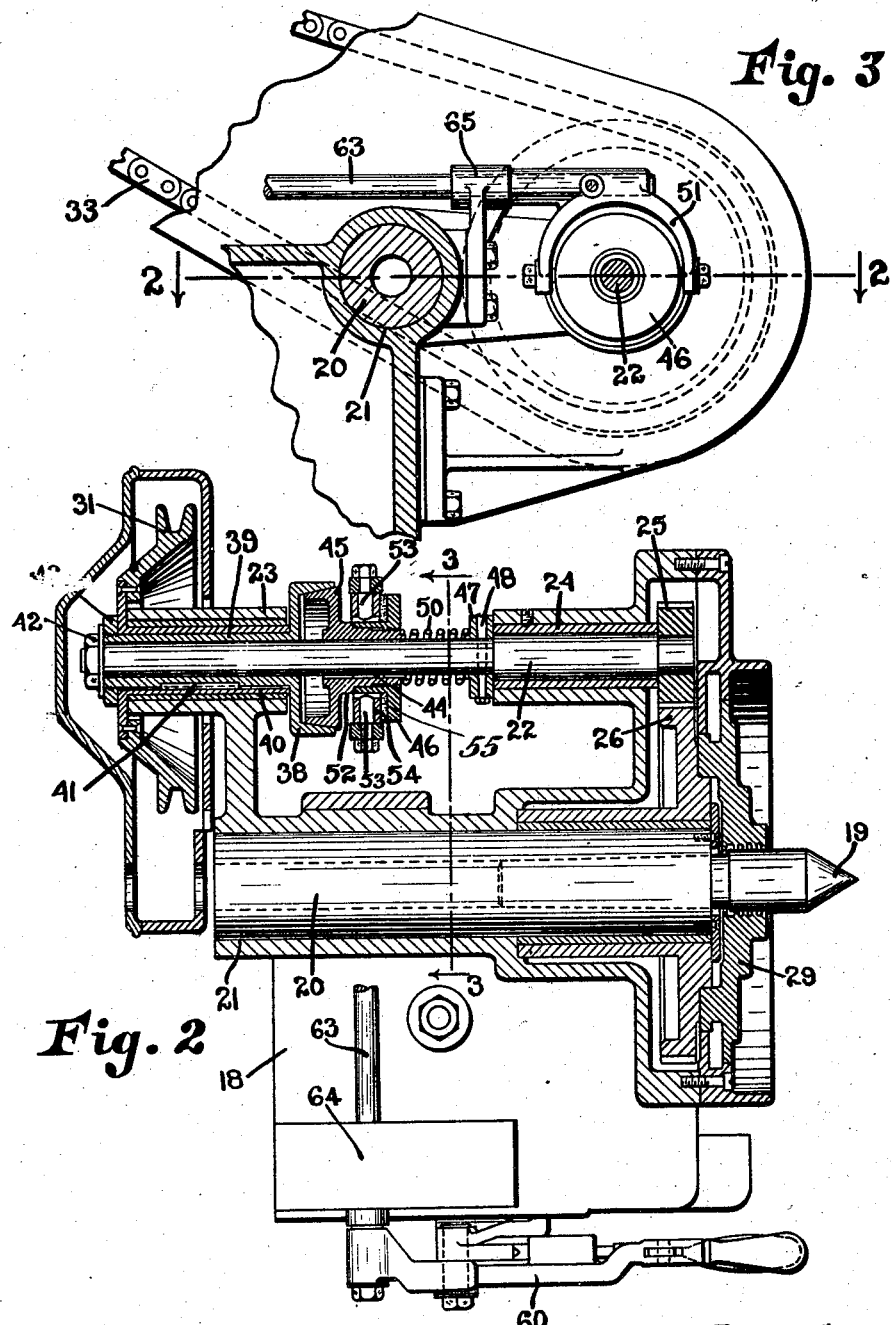

Patented June 7, 1927.

1,631,458

UNITED STATES PATENT OFFICE.

ALBERT G. BELDEN, OF WORCESTER, MASSACHUSETTS, ASSIGNOR TO NORTON COMPANY, OF WORCESTER, MASSACHUSETTS, A CORPORATION OF MASSACHUSETTS.

MACHINE-TOOL WORK SUPPORTING AND DRIVING MECHANISM.

Application filed February 19, 1924. Serial No. 693,890.

My invention relates to machine tools and more particularly to a headstock of the self-contained, motor driven type.

The headstock usually employed on a machine tool of the type of a grinding machine has been driven from an overhead countershaft, or by universally connected shafting in the base of the machine or by a motor mounted on the headstock itself. This invention relates particularly to the motor driven type, but in certain aspects applies broadly to each type.

In the usual headstock construction, and particularly in machines adapted for grinding heavy pieces of work, there is a tendency, when the power is disconnected, for the work to keep on rotating under its own momentum until friction brings it to rest. If such a machine is being used for fast production where time is important there is considerable waste of time and a consequent loss of efficiency.

The main objects of my invention are to provide an improved grinding machine headstock construction which is simple in design and easily and economically manufactured and assembled, which is serviceable for rapid production and which enables the operator to stop the work rotation without delay when the power is disconnected from the work driving plate.

In the drawings in which like reference numerals indicate like parts:

Fig. 1 is a fragmentary front elevation of a grinding machine having a headstock mounted thereon;

Fig. 2 is a sectional view of my headstock taken approximately on the line 2—2 of Fig. 3; and Fig. 3 is a fragmentary section taken approximately on the line 3—3 of Fig. 2.

In accordance with one embodiment of my invention I provide a grinding machine having a base 11, upon which is slidably mounted a work table 12, with a headstock 13, adjustably positioned thereon. The base may be provided with a suitable mechanism to reciprocate or traverse the work table relative to the grinding wheel 14. For the sake of simplicity of illustration, I have shown a hand traverse mechanism, such as is illustrated in the patent to Norton et al No. 1,299,765 of April 8, 1919, which is suitably connected to a rack (not shown) underneath the work table to move the same.

In my preferred construction, the headstock comprises a base 18, which is adapted to fit on the work table and support the other parts of the self-contained electric-driven headstock. While the headstock may be of either the dead center or the live center type, I have shown it as having a dead center 19 mounted in the fixed spindle 20, which is suitably mounted in the opening 21 of the base 18. A second shaft 22 is mounted in suitable bearings 23 and 24 parallel with and above the spindle. On the end of this shaft 22, I mount a gear 25, which in turn meshes with a gear 26, rotatably mounted on the fixed spindle 20. Surrounding the center 19 is a work driving plate 29, which is fixed to the gear 26. In headstocks where a live center is employed, the gear 26 and drive plate 29 would be fixed to the spindle to rotate the same.

The shaft 22 may be suitably driven as by a pulley 31 rotatably mounted on the shaft 22 and adapted to be connected thereto by means of a clutch mechanism. The pulley may be driven by a single or variable speed electric motor 32 mounted on the upper surface of the base 18 and connected with a source of electrical energy through desired control devices, but it is to be understood that the shaft 22 may be driven through its clutch from any desired source of power. The armature shaft of the motor is provided with a pulley 34, which is connected by a link type V-belt 33 with the pulley 31, each being provided with a V-shaped driving groove for this purpose. This particular type of belt is desirable as it bears upon the beveled faces of the groove of each pulley and not upon the bottom of the groove. The belt wedges into the groove and is prevented from slipping, and consequently increases the driving efficiency of the headstock.

To stop and start the work readily without stopping the motor, I provide a suitable clutch mechanism to connect pulley 31 with the shaft 22, which includes a friction disk arranged to act as a brake and stop the rotation of the work the instant the clutch is thrown. This clutch may be of any suitable type but as illustrated comprises a member 38 having an internal cone-shaped aperture. The member 38 is provided with an extended hub 39, which serves as a bearing on the shaft 22. The pulley 31 has an inwardly extending hub 40, which surrounds the hub 39 and is keyed thereto by a key 41. These parts are held in place between the member 38 and the central web of the pulley 31 by means of a nut 42 and collar 43, which are screw-threaded onto the shaft 22 and the hub 39 respectively. Surrounding the shaft 22 and slidably keyed thereto by a key 44 is the second clutch member 45 which has an external cone-shaped surface that mates with the internal cone-shaped surface of the member 38. The hub of the member 45 has a flanged member 46 screw threaded thereon, which is arranged to serve as a part of the brake. I provide the shaft 22 with a collar 47, fixed thereto by a taper pin 48, which takes up the end thrust of the shaft. Interposed between the clutch member 45 and the collar 47 and surrounding the shaft 22 is a spring 50, which tends to urge the member 45 into engagement with the member 38.

To disconnect the clutch and by the same operation to stop the rotation of the work, I employ a yoked member 51, which straddles the grooved portion 52 between the clutch member 45 and the flange 46. This yoke is provided with pins 53, which support the loose fitting annular ring 54. This annular ring is adapted to be moved against the friction disk by the yoke 51 to disconnect the clutch and also cause a friction to brake the rotation of the shaft 22. Interposed between the member 54 and flange 46 is a friction disk 55 adapted to be held in frictional engagement with the flange, when the yoked member is moved to disconnect the clutch. The pressure of spring 50 transmitted to this frictional device quickly brings the work to a standstill, due to the friction between the rotating flange and the stationary parts of the yoke device which are mounted on the base of the headstock.

For convenience in operating, I provide a suitable hand lever 60 pivotally mounted on the front of the headstock where it is easily accessible to the operator. In machines having a long work table, this hand lever may be arranged differently so that it may be operated from any point along the table. The lever 60 has a cam shaped portion 61 which engages the undersurface of a lever 62. The latter is mounted on the front end of a rock shaft 63, which is carried in suitable bearings 64 and 65 in the frame 18. On the other end of the shaft 63 is mounted the yoked member 51. The lever 60 is mounted upon a bracket 66 which also carries a notched plate 67, having two notches therein. As shown in Fig. 1 the lever 60 is provided with a spring pressed latch, which engages the notches in the plate 67 and holds the lever 60 in either the stopping or starting position.

The operation of this mechanism is apparent from the foregoing disclosure. The drawings illustrate the clutch members in engagement and connecting the pulley 31 and the shaft 22 so as to drive the work. If it is desired to stop the rotation of the work without stopping the electric motor, the operator releases the latch pin on the lever 60 and pushes the lever downwardly against the pressure of the spring 50. This action rocks the shaft 63 through the arm 62 and swings the yoked member 51 toward the friction disk and disconnects the cone faces of the clutch. The tension of the spring 50 tends to move the flanged member 46 toward the yoke member and thus causes friction between the disk 55 and the flange 46. These parts, therefore, act as a brake and stop the rotation of the shaft 22 and the work-driving plate geared thereto, immediately after the clutch is disengaged.

Having thus described my invention what I claim as new and desire to secure by Letters Patent is:

1. A machine tool headstock comprising a base, a work supporting spindle mounted thereon, a work drive plate mounted on the spindle, a shaft parallel with and geared to said drive plate, a drive pulley rotatably mounted on said shaft, a source of power, driving connections between said source of power and shaft and a clutch to connect said pulley and shaft.

2. A machine tool headstock, comprising a base, a work supporting spindle mounted thereon, a work drive plate mounted on said spindle, a shaft mounted on the base parallel with said spindle, gearing operated by the shaft to rotate the drive plate, a motor mounted on said headstock and clutch driving mechanism to connect and disconnect said motor and shaft to control the rotation of the work.

3. A machine tool headstock comprising a base, a work supporting and rotating mechanism mounted thereon, a driven shaft rotatably mounted on the base, driving connections between the shaft and mechanism, means including a clutch to connect the shaft with a source of power to rotate the work and a frictional device to stop the rotation of the work after the clutch has been disconnected.

4. A machine tool headstock comprising a work supporting and driving mechanism, a driven member, a clutch to connect the member with said mechanism and rotate the work, a friction disk connected to rotate with the work and a friction member arranged to be thrown into contact with said disk by movement of the clutch to disconnect the power from the work, so as to positively stop the rotation of the work.

5. A headstock for a machine tool comprising a base, an electric motor mounted thereon, a work supporting spindle on the base, a shaft mounted in parallel with said spindle, a pulley rotatably mounted on the shaft and driven by said motor, a friction clutch to connect the pulley and the shaft, and a friction device cooperating with said clutch to stop the rotation of the work as soon as the clutch has been disengaged.

6. A headstock for a machine tool comprising a work support, a shaft mounted on the headstock which is connected to drive the work, a driven member rotatably mounted on said shaft, a friction drive clutch having one part connected to said member and another slidably keyed to the shaft, a friction plate rotatable with the shaft, and means to disconnect the clutch and stop the work rotation including a member mounted on the base and movable into engagement with the friction plate to retard the rotation of the shaft when the clutch parts are disconnected.

7. A headstock for a machine tool comprising a workdriving member, a shaft mounted on the headstock and connected to rotate said member, a positively driven pulley rotatably mounted on the shaft, a friction clutch having one member rotatable with the pulley and a second member slidably connected with the shaft, a friction plate fixed to said second clutch member, a yoke operably connected with the slidable clutch member to operate the clutch and having a portion arranged to engage the friction plate when the clutch members are disengaged, a spring tending to hold the clutch members in engagement and manually operable means to move the yoke against the tension of the spring.

Signed at Worcester, Massachusetts, this 18th day of February, 1924.

ALBERT G. BELDEN.